United States Patent [19]

Spaziante

[11] Patent Number: 4,510,026

[45] Date of Patent: Apr. 9, 1985

[54] PROCESS FOR ELECTROLYSIS OF SEA WATER

[75] Inventor: Placido M. Spaziante, Lugano, Switzerland

[73] Assignee: Panclor S.A., Cemano, Switzerland

[21] Appl. No.: 552,484

[22] Filed: Nov. 16, 1983

[51] Int. Cl.³ .............................................. C25B 1/26
[52] U.S. Cl. ........................................ 204/95; 204/98; 204/128
[58] Field of Search ................... 204/95, 98, 128, 266, 204/82

[56] References Cited

U.S. PATENT DOCUMENTS

| | | | |
|---|---|---|---|
| 3,520,787 | 7/1970 | Nystroem | 204/95 |
| 3,925,174 | 12/1975 | Eng et al. | 204/95 |
| 3,997,414 | 12/1976 | Casson et al. | 204/95 |
| 4,160,716 | 7/1979 | Wireman | 204/95 |
| 4,319,969 | 3/1982 | Oda et al. | 204/98 |

Primary Examiner—Howard S. Williams
Assistant Examiner—Terryence Chapman
Attorney, Agent, or Firm—Charles A. Muserlian

[57] ABSTRACT

In the process of electrolysis of aqueous alkali metal halide solutions to produce hypohalite, halogen, halate and/or perhalate, the improvement comprising operating the electrolysis at least intermittently at a pressure less than 0.7 atmosphere, preferably sodium chloride solutions.

5 Claims, No Drawings

PROCESS FOR ELECTROLYSIS OF SEA WATER

STATE OF THE ART

Direct electrolysis of brine or sea water is commonly used for the production of hypochlorite, of chlorate, and of perchlorate and direct production of hypochlorite is particularly useful for the sterilization of potable water, swimming pools, sewage, and cooling water circuits of power stations and chemical plants to prevent marine growth in the heat exchange. The in-situ production of hypochlorite avoids the costly and dangerous transportation and storage of liquid chlorine, or the transportation of large amounts of hypochlorite solutions which, especially in hot climates, degrades rapidly. Hypochlorite has a specific oxidizing and sterilizing effect and has the advantages of regenerating the original chloride when in contact with organic substances or through the effect of light, heat or easily oxidizable ions. No noxious residues are left in the treated water after the sterilization process.

The fundamental reations occuring in the cell when a direct current flows through brine or sea water are the following:

At the anode—production of chlorine:

$$2Cl^- \rightarrow Cl_2 + 2e \qquad \text{I}$$

At the cathode—generation of hydrogen and formation of hydroxide ions:

$$2H_2O + 2e \rightarrow 2OH^- + H_2 \qquad \text{II}$$

In the gap between the electrodes—direct interaction between chlorine and hydroxide ion which generates hypochlorite:

$$Cl_2 + 2OH^- \rightarrow ClO^- + Cl^- + H_2O \qquad \text{III}$$

If the operating temperature is higher than 40° C. and a low pH saturated brine is used as electrolyte, the following chemical reactions, generating chlorate, take place:

$$ClO^- + 2HClO \rightarrow ClO_3^- + 2HCl \qquad \text{IV}$$

However, this electrolysis process presents many problems: Both sea water and common salt contain in addition to chloride, other ions such as calcium and magnesium which tend to deposit on the cathode as hydroxides or carbonates during the electrolysis. This scale passivates the cathode and obstructs the interelectrodic gap of the cell. Several methods have been proposed for the removal of this scale such as increasing the velocity of the electrolyte in the electrode gap or reversal of polarity (U.S. Pat. No. 4,087,337), but none of these methods is satisfactory since they deteriorate the anodic coating, either mechanically due to the abrasive effect of the high speed of the electrolyte or by embrittlement of the titanium structure of the anode due to the hydrogen that evolves during the current reversal.

The possibility of softening sea water or brine entering the system is not economically valid, given the large quantities in question. For every kilo of hypochlorite or active chlorine produced, between 200 and 1000 liters of sea water or dilute brine (15–30 g/l) are required in order to obtain a hypochlorite concentration of between 1 and 6 g/l. Higher hypochlorite concentration would correspond to an efficiency of the cell too low to be economical. The only practical solution applied to remove scale is washing the electrolyzer with hydrochloric acid, but this method is complicated, involves temporary shut-down of the plant, and is time-consuming for the operating personnel.

Another problem with this process is the increase of the temperature of the electrolyte during electrolysis which increase in temperature is due to the electrode overvoltage, to the "Joule" effect of the electrical conductor, and partially to reactions III and IV. It is therefore necessary to circulate the electrolyte through heat exchangers to keep the temperature at the desired value. For the production of hypochlorite, the temperature has to be kept below 35° C. since it is known that at temperatures higher than 35° C., the hypochlorite deteriorates rapidly, giving, according to the pH, chlorides or chlorates. This cooling is carried out in very expensive heat exchangers made of titanium, graphite, or other precious metals which are resistant to the corrosive attack of chlorine. The cost of the heat exchangers is such that the process is, in some cases, not economically feasible. In addition, the presence of the heat exchanger requires the use of a recirculation pump which, generally, is also costly due to the corrosive nature of the electrolyte. In the same way, for the production of chlorate, where generally the operating temperature is much higher (50° to 90° C.), it is indispensable to cool the electrolyte to remove the heat produced and to keep the temperature of the electrolyte to the desired value.

Another problem relates to the life of the electrode. Generally stainless steel or titanium are used as the cathode. Titanium has the advantages of rendering the construction of the cell much simpler and more economical, but the life of this cathode is generally limited due to the formation of metallic hydrides. The cathodic reaction can be represented by:

$$H_2O + e \rightarrow H\cdot_{ad} + OH^- \qquad \text{V}$$

The radical H· adsorbed in the metallic structure can go in two directions:

(i) to produce the hydrogen molecule:

$$2H\cdot_{ad} \rightarrow H_2 \uparrow \qquad \text{VI}$$

(ii) to remain at the cathode, forming hydrides in the case of titanium:

$$Ti + 4H \rightarrow TiH_4 \qquad \text{VII}$$

thereby producing a degradation of the cathode. In addition, the radical H· is free to migrate in the cathodic structure and is considered the cause of the degradation of the anodic coating by weakening the bond of "anodic structure/coating".

All the problems connected with the titanium embrittlement, especially in the welding between titanium and other metals, are related to the hydride formation and it is evident that while reaction V, which produces an increase of population of the radical H· in the titanium structure, is favored only by an increase of current density, reaction VI is favored by a decrease of the hydrogen pressure.

In the same way, the anodes undergo a degradation due to the oxygen evolution according to reaction VIII.

$$2H_2O \rightarrow O_2 + 4H^+ + 4e \qquad \text{VIII}$$

This reaction which is the cause of the decrease in efficiency of the process and which occurs mainly when low concentration of chlorides is used causes a rapid deterioration of the anodic coating. It is known that increasing the pressure of the system, and consequently increasing the pressure of the gaseous products, namely chlorine and oxygen, an increased velocity of the absorption of oxygen in the coating occurs. This absorption causes the deactivation of the oxide coatings and therefore, it is not convenient to carry out the electrolysis process under pressure for the production of chlorine because a rapid deterioration of the anode occurs.

OBJECTS OF THE INVENTION

It is an object of the invention to provide an improved process for the electrolysis of aqueous alkali metal halide solutions operating under at least intermittent reduced pressures of 0.7 atmospheres.

It is another object of the invention to provide an improved electrolysis process with increased electrolyte circulation and a controlled temperature.

These and other objects and advantages of the invention will become obvious from the following detailed description.

THE INVENTION

In the process of the invention for the electrolysis of aqueous alkali metal halide solutions to produce hypohalite, halogen, halate or perhalate, the improvement comprises effecting the electrolysis with the electrolyte surface under a reduced pressure at least intermittently. The operation of the electrolysis suprisingly eliminates the prior art problems in diaphragm or membrane cells.

An intermittent application of a reduced pressure of a few meters of liquid is generally sufficient to evaporate enough water to reduce the electrolyte temperature, remove all scaling from the cathode due to the blasting effect of the larger hydrogen bubble produced at the cathode, enhance circulation because of a larger volume of hydrogen produced with the consequent increase of hydrogen lifting effect, remove the hydrogen produced thereby obtaining an almost hydrogen-free hypochlorite solution or chlorate solution and increase the life of the electrodes by reducing the amount of hydrogen and oxygen absorbed on the cathodes and anodes, respectively. The evaporation of the water, which controls the temperature of the electrolyte, will also increase the concentration in the case of chlorate making recovery less expensive.

The prior art problems are solved by applying a reduced pressure on the surface of the catholyte where the hydrogen is being separated. This reduced pressure can be easily applied by means of an ejector using cold water or steam or by a vacuum pump or aspirator. No particular modifications of the electrolytic cell are necessary since the reduced pressure required for this purpose, in most cases, is only of a few m.l.c. pressure which can be applied to any regularly engineered electrolytic cell.

The first evident effect that occurs when vacuum is applied is a substantial increase of the volume of the hydrogen produced on the cathode. This increase of volume may produce a slightly higher voltage due to the bubble effect, but if the electrolyte is left free to circulate, the higher volume of hydrogen enhances this circulation, reducing the bubble effect. This circulation is extremely useful for the process since it promotes the diffusion of the chlorides from the bulk of the solution to the anodes and helps the removal of scale from the cathodes. This scale removal, however, is attributed not only to the circulation but essentially to the larger bubble hydrogen evolution on the cathode produced by the reduced pressure which breaks and removes the deposits by an explosive effect.

It has been observed that, operating a cathode at atmospheric pressure under 20 cm of electrolyte using brine doped with calcium and magnesium, a deposit was formed onto the cathode after approximately one day of operation at 10 A/dm$^2$. By applying a reduced pressure of 60 mm Hg on the surface of the electrolyte with a glass water ejector, a complete removal of this scale occured after only a few minutes of operation. The same effect was obtained by increasing the current density to 100 A/dm$^2$ at atmospheric pressure. The volume of hydrogen evolved is the same in both cases, but the latter method of removal of the scale cannot be applied in normal practice since it would involve the use of electrical equipment several times bigger and it may have a detrimental effect on the anodes.

The second effect that the reduced pressure has is the control of the electrolyte temperature. In all the processes for production of hypochlorite, chlorate or perchlorate, the temperature of the electrolyte tends to increase beyond the desired value, and cooling the electrolyte is necessary. Reduced pressure generates the necessary evaporation of the water, favored by the hydrogen evolution and it has been noticed that the higher the vacuum applied, the lower the equilibrium temperature of the electrolyte. It is therefore very simple to obtain the desired temperature by varying the pressure of the system. Of course, the beneficial effect of the reduced pressure is not only in the cooling of the electrolyte, but also in its consequent concentration which is particularly useful in the production of chlorate and perchlorate where the product is recovered by crystallization process which requires evaporation of water. For chlorate production, the temperature is kept at 40° to 110° C. and for hypochlorate, it is kept at 15° to 40° C. preferably.

This method of applying a reduced pressure does not increase substantially the cost of the plant since, generally, air is blown by means of a mechanical fan over the electrolyte to dispose of the hydrogen. A large quantity of air has to be used to reduce the concentration of hydrogen to below the explosive limit of hydrogen in air, which is about 4% volume and these blowers are therefore very expensive and bulky. The method of the invention uses much smaller equipment to produce the vacuum and much safer conditions, since the limit of explosive of air in hydrogen is over 25% volume, and is further increased at reduced pressure.

Another advantage of the electrolysis at reduced pressure is that both electrodes, anode and cathode, undergo a minor deterioration and it is known that the deactivation process of the anodes is due principally to oxygen development that is adsorbed irreversibly from the eltrocatalytic coating and the low pressure reduces this adsorption. In the same way, the low pressure discourages the formation of cathodic hydrides which effect the cathode life.

Another very important advantage is that when sea water is used, the hydrogen remaining in the chlorinated sea water is less at a low pressure. The hydrogen remaining in the sea water is proportional to the partial hydrogen pressure in the gaseous phase above the electrolyte. By decreasing the total pressure of the electrolysis cells, a smaller quantity of hydrogen in the chlorinated sea water can be obtained by Henry's Law. If sea water is used to cool the generating station's circuits, a small quantity of hydrogen reduces the embrittlement of the cooling pipe.

Moreover, this invention is useful when chlorine is produced using a solid electrolyte cell in which the catalyst is supported on the membrane which is pressed against the current-collector mode of a metallic mesh. The reduced pressure, applied, for example, to the cathodic compartment, favors the adhesion of the coated membrane to the cathodic current-collector.

The novel electrolysis cell of the invention is comprised of a housing containing at least one anode and one cathode forming an interelectrodic gap, means for introducing electrolyte into the housing, means for removal of electrolytic products and spent electrolyte and means for reducing the pressure on electrolyte surface to less than 0.7 atmospheres at least intermittently.

In the following examples there are described several preferred embodiments to illustrate the invention. However, it should be understood that the invention is not intended to be limited to the specific embodiments.

EXAMPLE 1

Electrolysis of brine was effected in a series of four cells arranged hydraulically and electrically in series and were connected to a 2-liter vessel. Appropriate inlets and outlets permitted the continuous feeding of fresh brine and the removal of spent brine and electrolysis products, respectively. Each of the four electrolyzer cells was in the shape of a cylinder with a diameter of 5 cm and were equipped with bipolar electrodes having an electrode surface of 50 cm$^2$. The cylinders were placed about 40 cm below the 2-liter vessel and were connected to the vessel by flexible tubes to permit easy recycling of brine and simple disengagement of hydrogen gas. The electrolyzers were connected to the poles of a direct current rectifier and the vessel was connected to a water ejector to create a vacuum therein. A long mercury theremometer was immersed into the liquid in the vessel.

In a first test, 1.2 liters of brine containing 30 g/liter of sodium chloride were charged into the vessel and the electrolyzer was operated at atmospheric pressure at a current density of 0.1 amp/cm$^2$ (5 amp-19 volts). The initial temperature was 20° C. and during operation it increased by about 1° C. every 2 minutes, reaching 40° C. after 40 minutes of operation and a slow circulation of the electrolyte from the electrolyzer to the collecting vessel was noted. When the ejector was started and the vessel was brought to the absolute pressure of a few centimeters of mercury, a sharp drop of the temperature was noted which, after 15 minutes, reached 29° C. and became stabilized at about 25° C. while the electrolyzer continued to be run at the load of 5 amps. Also, a rapid circulation of the electrolyte was noted which was measured and was found to be 1 liter per minute.

In a second test, the system was placed under vacuum and was run starting at 20° C. at the load of 5 amperes and the temperature rose, and after several hours of operation stabilized at about 26° C.

In a third test, the same apparatus was run under the said conditions (5 amps) but the reduced pressure was applied only every 10 minutes for 5 minute intervals for every 5 minutes of operation at atmospheric pressure and 600 ml of chlorinated brine were taken from the system and the same quantity of chlorinated brine was charged at 30 g/liter. This operation, therefore, was carried out six times per hour, and the vacuum was alternately applied for 5 minutes every 10 minutes. The concentration of active chlorine in the solution obtained was found to be 4.2 g/liter and hence the faraday yield was about 80%. The same apparatus was run at 5 amperes using a brine containing 30 g/liter of sodium chloride and about 4 g/liter of calcium chloride and 2 g/liter of magnesium chloride. After half an hour of operation at atmospheric pressure, a crystalline white precipitate was noted on the cathodic surface. When the system was subsequently run under vacuum for about 2 minutes, complete removal of the cathodic deposits was obtained. The same apparatus was run using a vacuum pump of the "Gast Manufacturing Company Ltd." instead of the water ejector with the same results being obtained.

EXAMPLE 2

Using the equipment of Example 1, the system was fed with 1.5 liters of a saturated solution of sodium chloride containing 2 g sodium bichromate, and it was run at 10 A (corresponding to 2000 A/m$^2$). The temperature of the system rose to 80° C. after one hour of operation. The current was cut off to avoid further increase of the temperature which would have resulted in breakage of the plastic cylinders after which a negative pressure was applied to the system with an ejector. The electrolyte cooled rapidly and the electrolyzer could be restarted. It could be seen that the temperature could easily be controlled as a function of the degree of vacuum imposed. The system was run for several hours and the chlorate contained in the electrolyte was analyzed by titration so that it was possible to check the faraday yield which was found to be about 91%.

EXAMPLE 3

A membrane cell used for this experiment and consisted of a cathode formed by a flat mesh of stainless steel (40×80 mm) soldered (at a distance of 5 mm) parallel to a sheet of stainless steel. A foraminous sheet of titanium coated with a catalyst suitable for chlorine development and kept in a plastic box which acted as anodic compartment and a cationic membrane of Nafion was disposed between the anode and the cathode. The cell was inserted into a hydraulic system formed by the necessary vessels containing saturated brine and caustic soda, by a pump and pipes to permit the brine to circulate in the anolyte of the cell, and by necessary pipes to permit caustic soda to circulate in the catholyte of the cell and in the soda collection vessel. The cell was connected to a current rectifier capable of supplying 12 A and the cell was run by applying to the catholyte circuit a reduced pressure with an ejector. The cell was run at 12 A and under these conditions, the temperature of the anolyte and of the catholyte increased, reaching 80° C. after 90 minutes. Under these conditions, it was no longer possible to continue the operation without cooling the system. By applying a reduced pressure by means of a water ejector to the cathodic compartment, it was possible to reduce the temperature of the cell to lower values and to continue its operation. It was noted that the temperature of the cell could easily be regulated by the degree of vacuum, that is, by the quantity of water removed by the ejector and the same results were obtained with a vacuum pump.

EXAMPLE 4

The cell of Example 3 was used, but an asbestos diaphragm was installed instead of the membrane. It was thus possible to check not only the temperature but also the rate of migration of the anolyte from the anodic compartment to the cathodic compartment. The cell was run at 10 A and 65° C. for 8 hours at a reduced pressure of about 5 m while continuously feeding fresh saturated brine into the anodic compartment. At the cathode, a solution containing 135/g liter of NaOH and 95 g/liter NaCl was obtained and the faraday yield was measured and was found to be 96%.

Various modifications of the process and apparatus of the invention may be made without departing from the spirit or scope thereof and it is to be understood that the invention is intended to be limited only as defined in the appended claims.

What I claim is:

1. In the process of electrolysis of sea water in a cell with an anode compartment and a cathode compartment to produce hypohalite, halogen, halate and/or perhalate, the improvement comprising effecting the electrolysis of sea water at least intermittently at a pressure less than 0.7 atmosphere in the cathode compartment.

2. The process of claim 1 wherein the reduced pressure is sufficient to evaporate water to maintain the seawater in the cell at 15° to 40° C. and recovering a sodium hypochlorite solution.

3. The process of claim 1 wherein the reduced pressure is sufficient to evaporate water at a rate to maintain the seawater in the cell at 40° to 100° C. and recovering a sodium chlorite solution.

4. The process of claim 1 wherein the anode and cathode for the electrolysis are separated by a diaphragm.

5. The process of claim 1 wherein the anode and cathode for the electrolysis are separated by a membrane.

* * * * *